United States Patent [19]

DenHartog et al.

[11] Patent Number: 4,525,521
[45] Date of Patent: Jun. 25, 1985

[54] COATING COMPOSITION OF AN ACRYLIC POLYMER HAVING AMINO ESTER GROUPS AND A GLYCIDYL ACRYLIC POLYMER

[75] Inventors: Herman C. DenHartog, Pontiac; Aloysius N. Walus, Troy, both of Mich.

[73] Assignee: E. I. Du Pont de Nemours and Company, Wilmington, Del.

[21] Appl. No.: 635,350

[22] Filed: Jul. 27, 1984

Related U.S. Application Data

[63] Continuation-in-part of Ser. No. 542,135, Oct. 14, 1983, abandoned.

[51] Int. Cl.³ .................. C08L 37/00; C08K 3/10; C08K 5/34; C09D 3/74
[52] U.S. Cl. .................. 524/517; 428/416; 428/425.5; 524/91; 524/100; 524/293; 524/295; 524/299; 524/359; 524/364; 524/413; 524/501; 525/194; 525/208; 525/228; 525/375
[58] Field of Search .............. 524/501, 517; 428/416, 428/422.2, 425.5; 525/194, 208, 228

[56] References Cited

U.S. PATENT DOCUMENTS

| | | | |
|---|---|---|---|
| 3,472,914 | 10/1969 | Comstock et al. | 524/517 |
| 3,509,086 | 4/1970 | Rohrbacher | 523/400 |
| 3,538,185 | 11/1970 | Davis et al. | 525/208 |
| 3,558,564 | 1/1971 | Vasta | 524/507 |
| 3,758,632 | 9/1973 | Labana et al. | 524/517 |
| 3,758,634 | 9/1973 | Labana et al. | 524/517 |
| 3,789,037 | 1/1974 | Miller | 524/39 |
| 3,819,567 | 6/1974 | Swanson et al. | 524/438 |
| 3,844,993 | 10/1974 | Miller | 524/127 |
| 3,904,795 | 8/1975 | Mercurio | 427/375 |
| 3,914,333 | 10/1975 | Labana et al. | 525/208 |
| 3,963,806 | 6/1976 | Dornte | 525/417 |
| 4,020,216 | 4/1977 | Miller | 524/40 |
| 4,048,257 | 8/1977 | Stevenson | 525/31 |
| 4,131,571 | 12/1978 | Crawley et al. | 524/91 |
| 4,147,688 | 4/1979 | Makhlouf et al. | 524/461 |
| 4,211,691 | 7/1980 | Fitzgerald et al. | 524/507 |
| 4,225,480 | 9/1980 | Schimmel et al. | 525/119 |
| 4,242,243 | 12/1980 | Antonelli et al. | 525/208 |
| 4,272,621 | 6/1981 | McFadden et al. | 524/438 |
| 4,353,819 | 10/1982 | McFadden | 523/454 |

*Primary Examiner*—Herbert J. Lilling
*Attorney, Agent, or Firm*—Hilmar L. Fricke

[57] ABSTRACT

A coating composition which cures at ambient temperatures of 20–80% by weight of a binder and 80–20% by weight of a solvent for the binder, the binder contains about:

A. 60–80% by weight, based on the weight of the binder, of an acrylic polymer of polymerized monomers of methyl methacrylate and an alkyl methacrylate, an alkyl acrylate or mixtures thereof, each having 2–12 carbon atoms in the alkyl group and the polymer has pendent amino ester or hydroxy amino ester groups;

B. 20–40% by weight, based on the weight of the binder, of a glycidyl acrylic crosslinking polymer of polymerized monomers of glycidyl methacrylate or glycidyl acrylate and an alkyl methacrylate, alkyl acrylate or mixtures thereof, each having 2–12 carbon atoms in the alkyl group.

The composition is useful as an exterior finish for automobiles and trucks and for repairing finishes of automobiles and trucks.

17 Claims, No Drawings

COATING COMPOSITION OF AN ACRYLIC POLYMER HAVING AMINO ESTER GROUPS AND A GLYCIDYL ACRYLIC POLYMER

CROSS REFERENCE TO RELATED TO APPLICATIONS

This application is a continuation-in-part of Ser. No. 542,135 filed Oct. 14, 1983, now abandoned.

BACKGROUND OF THE INVENTION

This invention is related to a coating composition and in particular to a coating composition that cures at ambient temperatures.

Many currently available coating compositions used to finish and repair the exterior finishes of trucks and automobiles contain isocyanate compounds. These compositions cure at ambient temperatures and provide finishes with good physical properties such as gloss, hardness, weatherability, good adhesion, chip resistance and the like. Typical compositions are shown in Crawley et al. U.S. Pat. Nos. 4,131,571 issued Dec. 26, 1978, Miller 4,020,216 issued Apr. 26, 1977, Miller 3,844,993 issued Oct. 29, 1974, Miller 3,789,037 issued Jan. 29, 1974 and Vasta 3,558,564 issued Jan. 26, 1971. It would be desirable to provide an ambient temperature curing composition that does not contain an isocyanate compound but has all of the good properties of the aforementioned compositions.

The novel coating composition of this invention does not contain isocyanate compounds and cures at ambient temperatures and provides finishes that have excellent physical properties and are useful for exterior finishes of automobiles and trucks.

SUMMARY OF THE INVENTION

A coating composition containing about 20–80% by weight of a binder and 80–20% by weight of a solvent for the binder, wherein the binder contains about
  (a) 60–80% by weight, based on the weight of the binder, of an acrylic polymer of polymerized monomers of methyl methacrylate and an alkyl methacrylate, an alkyl acrylate or mixtures thereof each having 2–12 carbon atoms in the alkyl group and the polymer has pendent amino ester or hydroxy amino ester groups, and
  (b) 20–40% by weight, based on the weight of the binder, of a glycidyl acrylic crosslinking polymer of polymerized monomers of at least 60% by weight, based on the weight of the crosslinking polymer, of glycidyl methacrylate or glycidyl acrylate and an alkyl methacrylate, an alkyl acrylate or mixtures thereof each having 2–12 carbon atoms in the alkyl group.

DETAILED DESCRIPTION

The coating composition contains about 20–80% by weight of binder and 80–20% by weight of a solvent for the binder. The binder is a blend of about 60–80% by weight of an acrylic polymer and 20–40% by weight of a glycidyl acrylic crosslinking polymer. The composition can contain pigments in a pigment-to binder weight ratio of about 1:100–200:100.

The acrylic polymer is composed of polymerized monomers of methyl methacrylate, alkyl methacrylate, alkyl acrylate or mixtures thereof each having 2–12 carbon atoms in the alkyl group and has pendent amino ester groups or hydroxy amino ester groups. The polymer has a number average molecular weight of about 3,000–15,000 and a weight average molecular weight of about 6,000 to 40,000.

Molecular weight is determined by gel permeation chromatography using polymethyl methacrylate as the standard.

One method for preparing the acrylic polymer is to polymerize monomers of methyl methacrylate, alkyl methacrylate, alkyl acrylate or mixtures thereof and methacrylic acid or acrylic acid and then post react the carboxyl groups of the resulting polymer with an alkylene imine to form pendent amino ester groups from the backbone of the polymer.

The polymerization of the monomers to form the acrylic polymer is carried out by conventional techniques in which the monomers, solvents and polymerization catalyst are charged into a polymerization vessel and reacted at about 50°–175° C. for about 0.5–6 hours to form the polymer.

Typical polymerization catalysts that are used are azobisisobutyronitrile, azo-bis(gamma dimethyl valeronitrile), and the like.

Typical solvents used are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

One preferred acrylic polymer contains about 35–55% by weight methyl methacrylate, 35–50% by weight lauryl methacrylate or butyl methacrylate and 10–15% by weight methacrylic acid which polymer has been post reacted with an alkylene imine such as propylene imine to provide amino ester groups pendent from the carbon-carbon polymer backbone of the formula

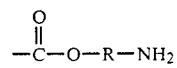

where R is an alkylene group having 2–3 carbon atoms.

Another preferred acrylic polymer contains about 10–50% by weight styrene, an alkyl methacrylate or an alkyl acrylate or mixtures thereof where the alkyl groups contain from 1–12 carbon atoms and methacrylic acid or acrylic acid which is post iminated with an alkylene imine to form aminoester groups pending from the backbone having the above formula. One particularly preferred acrylic polymer contains about 20–50% by weight styrene, 30–70% by weight of an alkyl methacrylate such as butyl methacrylate and 10–15% by weight of methacrylic acid or acrylic acid post reacted with an alkylene imine such as propylene imine to provide amino ester groups having the above formula.

In an alternative method for preparing the acrylic polymer, monomers of methyl methacrylate, alkyl methacrylate, alkyl acrylate or mixtures thereof and glycidyl methacrylate or glycidyl acrylate are polymerized using the above solvents, polymerization catalyst and procedure. The resulting polymer and ammonia are charged into a pressure vessel and heated to about 80°–150° C. and maintained at a pressure of about 14–35 kilograms per square centimeter (approximately 200–500 pounds per square inch) for about 1 to 8 hours or until all of the glycidyl groups have been reacted with ammonia. After the reaction of ammonia with the glycidyl groups of the polymer is completed, excess free ammonia is vacuum stripped off. The resulting polymer has hydroxy amino ester groups pending from the backbone of the polymer.

A preferred acrylic polymer prepared by the alternative method contains about 40–50% by weight methyl methacrylate, 25–45% by weight of an alkyl acrylate or methacrylate such as butyl methacrylate or lauryl methacrylate and 5–20% by weight glycidyl methacrylate or glycidyl acrylate that has been reacted with ammonia to form hydroxy amino ester groups pendent from the carbon-carbon polymer backbone of the formula

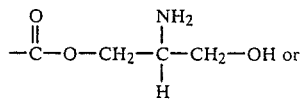 or

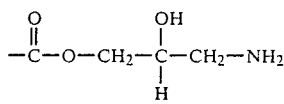

Another preferred polymer prepared by the alternative method contains about 10–50% by weight styrene, an alkyl methacrylate or an alkyl acrylate each having 1–12 carbon atoms in the alkyl group and glycidyl methacrylate or glycidyl acrylate that has been reacted with ammonia to form hydroxy amino ester groups pendent from the carbon-carbon polymer backbone having the above formulas. One particularly preferred acrylic polymer contains about 20–50% by weight of styrene 30–70% by weight of an alkyl methacrylate such as butyl methacrylate and 5–20% by weight of glycidyl methacrylate or glycidyl acrylate that has been reacted with ammonia to provide the aforementioned hydroxy aminoester groups.

The glycidyl acrylic crosslinking polymer is composed of polymerized monomers of glycidyl methacrylate or glycidyl acrylate and an alkyl methacrylate, alkyl acrylate or mixtures thereof each having 2–12 carbon atoms in the alkyl groups and has a number average molecular weight of about 5,000–20,000 and a weight average molecular weight of about 6,000–40,000. Preferably, the polymer contains about 60–85% by weight of glycidyl methacrylate and 15–40% by weight of an alkyl methacrylate such as lauryl methacrylate or butyl methacrylate. Other useful polymers contain about 40% by weight butyl methacrylate/60% glycidyl methacrylate and 20% butyl methacrylate/80% glycidyl methacrylate.

Typical alkyl methacrylate and alkyl acrylate monomers that are used to prepare the aforementioned polymers are ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

About 0.1–4% by weight, based on the weight of the binder, of a catalyst can be added to the coating composition. Typical catalysts are resorcinol, resorcinol monobenzoate, boron trifluoride amine complex, phenol, para methoxy phenol, and hydroquinone.

As mentioned before, the composition can contain pigments. These pigments can be introduced into the composition by first forming a mill base with the acrylic polymer utilized in the composition or with other compatible polymers or polymer dispersants by conventional techniques, such as sand-grinding, ball milling, attritor grinding, two roll milling to disperse the pigments. The mill base is blended with the film-forming constituents as shown in the following Examples.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

To improve weatherability of finishes of the coating composition about 0.1–5%, by weight, based on the weight of the binder, of an ultraviolet light stabilizer or a combination of ultraviolet light stabilizers can be added. Typically useful ultra-violet light stabilizers are disclosed hereinafter.

The coating composition of this invention can be applied over a variety of substrates, such as metal, wood, glass, plastic, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are usually dried at ambient temperatures and are tack free after about 1–4 hours and fully cured after about 4–7 days. The coatings can be baked at relatively low temperatures of about 65°–140° C. for about 15 minutes–2 hours. The resulting coating is about 0.1–5 mils thick but for most uses, a 1–3 mil thick coating is used. One technique that is used to insure that there will be no popping or cratering of the coating is to allow the solvents to flash off for about 15–30 seconds before a second coating is sprayed on or otherwise applied, then waiting from about 2–10 minutes before baking the coating to allow any residual solvents to flash off if the coating is to be baked. The resulting coating has good gloss and can be rubbed or polished with conventional techniques to improve the smoothness, appearance and gloss. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of finishes of trucks and automobiles.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention and contains pigments in a pigment-to-binder ratio of about 1/100 to 150/100 and other additives.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–2.0 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015–50 microns. Typical pigments that can be used in a pigment-to-binder weight ratio of about 1/100 to 10/100 are inorganic siliceous pigments, such as silica pigments. These pigments have a refractive index of about 1.4–1.6.

To form a durable finish, the clear coat and optionally, the color coat contain about 0.1–5% by weight based on the weight of the binder, of an ultraviolet light stabilizer. Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

One preferred combination of ultraviolet light stabilizer is a benzotriazole and a hindered amine light stabilizer and is preferably used in a weight ratio of about 1:1. The combination is used in an amount of about 1–4% by weight, based on the weight of the binder. One preferred benzotriazole is "Tinuvin" 328, 2-(2 hydroxy-3,5-ditertiary amyl-phenol)-2H-benzotriazole and a preferred hindered amine is "Tinuvin" 292, bis(1,2,2,6,6-pentamethyl-4 piperidinyl)sebacate. Another preferred hindered amine is "Tinuvin" 770, di[4(2,2,6,6 tetramethyl piperdinyl)]sebacate.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following Examples illustrate the invention. All parts and percentages are on a weight basis unless otherwise indicated. The number and weight average molecular weights are determined by gel permeation chromatography using polymethyl methacrylate as a standard.

EXAMPLE 1

An iminated acrylic polymer solution was prepared by charging the following constituents into a reaction vessel equipped with a heating mantle, reflux condenser and a stirrer:

|  | Parts by Weight |
|---|---|
| Portion 1 |  |
| Toluene | 597.0 |
| Isopropanol | 268.0 |
| Methyl methacrylate monomer | 68.0 |
| Portion 2 |  |
| Methyl methacrylate monomer | 452.0 |
| Lauryl methacrylate monomer | 624.0 |
| Methyacrylic acid monomer | 137.0 |
| Azobisisobutyronitrile | 21.6 |
| Portion 3 |  |
| Methacrylic acid monomer | 19.7 |
| Toluene | 40.8 |
| Portion 4 |  |
| Toluene | 1002.0 |
| Portion 5 |  |
| Propylene imine | 118.0 |
| Total | 3348.1 |

Portion 1 was charged into the reaction vessel and heated to its reflux temperature. While maintaining the constituents in the vessel at the reflux temperature, Portion 2 was added at a uniform rate over about 1½ hours to form a polymeric reaction mixture. After Portion 2 was added, Portion 3 was added over a 45 minute period at a uniform rate to the reaction mixture and held at reflux temperature for 45 minutes. Portion 4 was then added and heat was turned off and the reaction mixture was allowed to cool to about 60° C. Portion 5 was added and the reaction mixture was held at its reflux temperature for about 6½ hours.

The resulting polymer solution had a polymer weight solids content of about 43.3%, and a relative viscosity measured at 25° C. of 1.0669. The polymer has a composition of 48% lauryl methacrylate, 40% methyl methacrylate, 12% methacrylic acid postiminated with propylene imine. The polymer had an acid number of 1.8, a calculated glass transition temperature of −20° C., a number average molecular weight of 11,100 and weight average molecular weight of 29,400.

A glycidyl acrylic crosslinking polymer solution was prepared by charging the following constituents into a polymerization vessel equipped as above:

|  | Parts by Weight |
|---|---|
| Portion 1 |  |
| Toluene | 765.0 |
| Methyl ethyl ketone | 344.0 |
| Portion 2 |  |
| Glycidyl methacrylate | 999.0 |
| Lauryl methacrylate | 666.0 |
| Azobisisobutyronitrile | 16.6 |
| Toluene | 10.5 |
| Portion 3 |  |
| Methyl ethyl ketone | 69.8 |
| Azobisisobutyronitrile | 3.0 |
| Total | 2873.9 |

Portion 1 is charged into the polymerization vessel and heated to its reflux temperature. Portion 2 is added at a uniform rate over a 90-minute period. After Portion 2 was added, Portion 3 is added over a one-hour period and the resulting mixture was held at its reflux temperature for an additional 30 minutes and then cooled to room temperature.

The resulting polymer solution had a polymer solids content of 56.6% and a relative viscosity measured at 25° C. of 1.0682. The polymer had the following composition: 60% glycidyl methacrylate and 40% lauryl methacrylate and has a number average molecular weight of 11,000 and a weight average and molecular weight of 32,500.

A white mill base was prepared by charging the following constituents into a sand mill and grinding the constituents until the pigments were thoroughly dispersed:

|  | Parts by Weight |
| --- | --- |
| Dispersing resin solution (55% solids in organic solvent of a polymer of 40% methyl methacrylate, 33% butyl methacrylate, 5% diethyl amino ethyl methacrylate, 7% hydroxy ethyl acrylate, 15% vinyloxazoline linseed oil fatty acid ester) | 24.73 |
| Butyl acetate | 4.58 |
| Aromatic hydrocarbon solvent | 3.38 |
| Aliphatic hydrocarbon solvent | 9.31 |
| Titanium dioxide pigment | 58.00 |
| Total | 100.00 |

A green mill base was prepared by charging the following constituents into a sandmill and grinding the constituents until the pigments were thoroughly dispersed:

|  | Parts by Weight |
| --- | --- |
| Dispersing resin solution (described above) | 44.23 |
| Xylene | 26.09 |
| Butyl acetate | 7.29 |
| Aliphatic hydrocarbon solvent | 26.09 |
| "Monastral" green pigment | 10.50 |
| Total | 114.20 |

A blue mill bases was prepared by charging the following constituents into a ball mill and grinding the constituents until the pigments were thoroughly dispersed:

|  | Parts by Weight |
| --- | --- |
| Dispersing resin solution (described above) | 32.90 |
| Xylene | 30.22 |
| Toluene | 29.18 |
| "Monastral" blue pigment | 7.70 |
| Total | 100.00 |

A black mill base was prepared by charging the following constituents into a ball mill and grinding the constituents until the pigments were thoroughly dispersed:

|  | Parts by Weight |
| --- | --- |
| Dispersing resin solution (described above) | 54.90 |
| Xylene | 33.00 |
| Carbon black pigment | 12.10 |
| Total | 100.00 |

An aluminum flake mill base was prepared by thoroughly mixing the following:

|  | Parts by Weight |
| --- | --- |
| Dispersing resin solution (described above) | 55.08 |
| Xylene | 7.42 |
| Butyl acetate | 6.00 |
| Aliphatic hydrocarbon solvent | 13.50 |
| Medium coarse aluminum paste | 18.00 |
| Total | 100.00 |

A composite white mill base was prepared by mixing the following:

|  | Parts by Weight |
| --- | --- |
| White mill base (prepared above) | 99.60 |
| Black mill base (prepared above) | 0.40 |
| Total | 100.00 |

A dark green metallic composite mill base was prepared by mixing the following:

|  | Parts by Weight |
| --- | --- |
| Black mill base (prepared above) | 27.26 |
| Green mill base (prepared above) | 64.95 |
| Aluminum flake mill base (prepared above) | 7.79 |
| Total | 100.00 |

A light blue metallic composite mill base was prepared by mixing the following:

|  | Parts by Weight |
| --- | --- |
| Green mill base (prepared above) | 1.51 |
| Blue mill base (prepared above) | 13.59 |
| Aluminum flake mill base (prepared above) | 84.90 |
| Total | 100.00 |

The following paints A–F were prepared as shown in Table I by thoroughly blending the constituents listed in a mixer.

TABLE I

| Paints | (Parts by Weight) | | | | | |
| --- | --- | --- | --- | --- | --- | --- |
|  | A | B | C | D | E | F |
| Composite white mill base | 249 | 249 | — | — | — | — |
| Dark green metallic composite mill base | — | — | 87 | 87 | — | — |
| Light blue metallic composite mill base | — | — | — | — | 74 | 74 |
| "Tinuvin"328-2-(2 hydroxy-3,5 di-tertiary amyl-phenol)2H—benzotriazole | 3 | 3 | 3.4 | 3.4 | 3.4 | 3.4 |
| "Tinuvin"292-bis(1,2,6,6-pentamethyl-4 piperidinyl)sebacate | 3 | 3 | 3.4 | 3.4 | 3.4 | 3.4 |
| Iminated acrylic polymer solution (prepared above) | 514 | 514 | 559 | 559 | 572 | 572 |
| Silicone oil solution (2% silicone oil in organic solvent) | 0.7 | 0.7 | 0.8 | 0.8 | 0.8 | 0.8 |
| Isopropanol | 11 | 11 | 12 | 12 | 12 | 12 |
| Resorcinol | — | 13.2 | — | 13.6 | — | 13.8 |
| Glycidyl acrylic cross-linking polymer solution (prepared above) | 116 | 116 | 126 | 126 | 130 | 130 |

Each of the above paints was reduced to a spray viscosity of 23 seconds measured with a #2 Zahn cup with a solvent blend of 70% xylene, 10% Butyl Cellosolve Acetate and 20% dimethyl esters of $C_4$–$C_6$ dibasic acids. Two sets of panels were prepared with each paint. The steel panels were primed with an alkyd resin primer and coated with an acrylic lacquer primer surfacer which was sanded. One set of panels was dried at ambient temperatures for 7 days and the second set of panels was baked at about 80° C. for about 30 minutes and then allowed to stand at ambient temperatures for 7 days. The resulting dry film thickness on each of the panels was about 2.1–2.4 mils.

All of the painted panels had good gloss and distinctness of image and had excellent resistance to weathering. Both sets of panels showed excellent resistance to water spotting, gasoline, gasohol, certain solvents such as methyl ethyl ketone, asphalt and grease.

EXAMPLE 2

An ammoniated acrylic polymer solution was prepared by charging the following constituents into a reaction vessel equipped as in Example 1:

|  | Parts by Weight |
|---|---|
| Portion 1 | |
| Methyl methacrylate monomer | 761.0 |
| Butyl methacrylate monomer | 360.0 |
| Glycidyl methacrylate monomer | 79.0 |
| Toluene | 500.0 |
| Isopropanol | 200.0 |
| Portion 2 | |
| Azobisisobutyronitrile | 14.0 |
| Toluene | 250.0 |
| Portion 3 | |
| Azobisisobutyronitrile | 7.5 |
| Toluene | 300.0 |
| Portion 4 | |
| Toluene | 26.0 |
| Isopropanol | 952.0 |
| Total | 3449.5 |

Portion 1 was charged into the reaction vessel and heated to its reflux temperature of about 90° C. About 25% of Portion 2 was added rapidly and the remainder of Portion 2 then was added over a 20 minute period and the resulting reaction mixture was held at its reflux temperature for an additional 90 minutes. Portion 3 was added over a 30 minute period and the reaction mixture was held at its reflux temperature for an additional 90 minutes. Portion 4 was added and the resulting polymer solution was cooled to an ambient temperature. The polymer solution was charged into a pressure vessel with ammonia and heated to about 100° C. and held under a pressure of about 14–35 kilograms per square centimeter (about 200–500 pounds per square inch) and reacted for about 6 hours until all of the glycidyl groups reacted with ammonia. Excess ammonia was then vacuum stripped from the solution.

The resulting polymer solution had a polymer weight solids content of 36.5% and a relative viscosity of 1.1372 measured at 25° C. The polymer had a composition of 63.4% methyl methacrylate, 30% butyl methacrylate and 6.6. hydroxy amino ester of a post reaction of ammonia with glycidyl methacrylate and had a number average molecular weight of 7,800 and weight average molecular weight of 36,000.

The following glycidyl acrylic polymer solutions were prepared using the same polymerization procedure as in Example 1 except butyl methacrylate was substituted for lauryl methacrylate in the amounts as shown below:

40% BMA/60% GMA Solution (55% polymer solids solution of 40% butyl methacrylate/60% glycidyl methacrylate polymer having a number average molecular weight of about 12,000 and a weight average molecular weight of about 23,000);

20% BMA/80% GMA Solution (55% polymer solids solution of 20% butyl methacrylate/80% glycidyl methacrylate polymer having a number average molecular weight of about 12,000 and a weight average molecular weight of about 23,000).

The following paints G and I were prepared as shown in Table II by thoroughly blending the constituents in a mixer:

TABLE II

| | (Parts by Weight) | |
|---|---|---|
| Paint | G | I |
| Light blue metallic composite mill base (prepared in Example 1) | 60.4 | 60.4 |
| Ammoniated acrylic polymer solution (prepared above) | 591.0 | 604.0 |
| 40% BMA/60% GMA solution | 35.0 | — |
| 20% BMA/80% GMA solution | — | 28.0 |
| "Tinuvin" 770 di[4(2,2,-6,6 tetramethyl piperidinyl)]sebacate | 2.6 | 2.6 |

Each of the above paints was reduced to spray viscosity described in Example 1 with the solvent described in Example 1. A set of steel panels was prepared with each paint. The panels were each primed with an alkyd resin primer and coated with an acrylic lacquer primer surfacer which was sanded. Each of the panels was tack free in about 1 hour, had a gloss measured at 20° of 46–48, a distinctness of image of greater than 50, gasoline resistant after 72 hours, toluene resistant about 192 hours, had excellent wet adhesion, was chip resistant and did not blister.

EXAMPLE 3

An iminated acrylic polymer solution was prepared by charging the following constituents into a reaction vessel equipped as in Example 1:

|  | Parts by Weight |
|---|---|
| Portion 1 | |
| Toluene | 1532 |
| Isopropanol | 689 |
| Butyl methacrylate monomer | 176 |
| Portion 2 | |
| Butyl methacrylate monomer | 1827 |
| Styrene monomer | 933 |
| Methacrylic acid monomer | 350 |
| Azobisisobutyronitrile | 87 |
| Toluene | 141 |
| Portion 3 | |
| Toluene | 105 |
| Methacrylic acid monomer | 51 |
| Portion 4 | |
| Toluene | 2430 |
| Portion 5 | |
| Propylene imine | 319 |
| Total | 8640 |

Portion 1 was charged into the reaction vessel and heated to its reflux temperature while maintaining the constituents in the vessel at the reflux temperature. Portion 2 was added at a uniform rate over about 1½ hours to form a polymeric reaction mixture. After portion 2 was added, portion 3 was added over a 15 minute period and the reaction mixture was held at its reflux temperature for an additional hour. Portion 4 was added and then portion 5 was added and the reaction mixture was held at its reflux temperature until the acid no. of the polymer was 2 or less.

The resulting polymer solution has a polymer weight solids content of about 42.3% and a relative viscosity measured at 25° C. of 1.067. The polymer has the following composition 28% styrene, 60% butyl methacrylate, 12% methacrylic acid post iminated with propyleneimine.

The following clear composition was formulated:

|  | Parts by Weight |
| --- | --- |
| Iminated acrylic polymer solution (prepared above) | 311.4 |
| Silicone Oil Solution (described above) | 0.4 |
| Isopropanol | 6.7 |
| "Tinuvin" 328 (described in Example 1) | 1.7 |
| "Tinuvin" 292 (described in Example 1) | 1.7 |
| Total | 321.9 |

100 parts of the above clear composition was blended with 20.8 parts of the 40% BMA/60% GMA solution described in Example 2 to form a clear coating composition. As in Example 1, the clear coating composition was reduced to a spray viscosity using the solvent blend of Example 1.

Paints A–F of Example 1 and Paints G and I of Example 2 were each sprayed into two sets of steel panels primed with an alkyd resin primer and coated with an acrylic lacquer primer surfacer which was sanded. After flash drying the panels for a relatively short time, e.g. 5–10 minutes, the above prepared clear coating composition was applied to the panels. One set of panels was dried at ambient temperatures for 7 days and the second set of panels was baked at 80° C. for about 30 minutes and then kept at ambient temperatures for 7 days. Each of the resulting panels had excellent gloss and distinctness of image and had excellent resistance to weathering. Also, the panels showed good resistance to water spotting, gasoline, gasohol and solvents such as methyl ethyl ketone and resistance to asphalt and grease.

We claim:

1. A coating composition comprising 20–80% by weight of a binder and 80–20% by weight of a solvent for the binder, wherein the binder consists essentially of about:
   A. 60–80% by weight, based on the weight of the binder, of an acrylic polymer consisting essentially of polymerized monomers of methyl methacrylate and monomers selected from the group consisting of alkyl methacrylate and alkyl acrylate each having 2–12 carbon atoms in the alkyl group and said polymer having pending from the carbon-carbon atoms of the polymer backbone aminoester groups of the formula

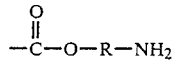

where R is an alkylene group having 2–3 carbon atoms or hydroxyamino ester groups of the formula

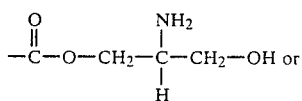

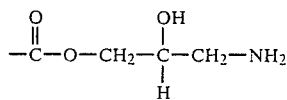

B. 20–40% by weight, based on the weight of the binder, of a glycidyl acrylic crosslinking polymer of polymerized monomers having at least 60% by weight of a glycidyl constituent selected from the group consisting of glycidyl methacrylate and glycidyl acrylate and polymerized monomers selected from the group consisting of alkyl methacrylate and alkyl acrylate each having 2–12 carbon atoms in the alkyl group;

said polymer having a weight average molecular weight of about 6,000–40,000 determined by gel permeation chromatography using polymethyl methacrylate as a standard.

2. The coating composition of claim 1 containing pigments in a pigment-to-binder weight ratio of 1:100 to 200:100.

3. The coating composition of claim 1 in which the acrylic polymer consists essentially of about 35–55% by weight, based on the acrylic polymer, of methyl methacrylate, 35–50% by weight, based on the weight of the acrylic polymer, of lauryl methacrylate or butyl methacrylate and 10–15% by weight, based on the weight of the acrylic polymer, of methacrylic acid; said polymer reacted with an alkylene imine to provide amino ester groups pendent from the carbon-carbon polymer backbone of the formula

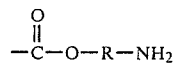

where R is an alkylene group having 2–3 carbon atoms.

4. The coating composition of claim 1 in which the glycidyl acrylic crosslinking polymer consists essentially of about 60–85% by weight, based on the weight of the glycidyl acrylic crosslinking polymer, of glycidyl methacrylate and 15–40% by weight, based on the weight of the glycidyl acrylic crosslinking polymer, of lauryl methacrylate or butyl methacrylate.

5. The coating composition of claim 1 in which the acrylic polymer consists essentially of 40–50% by weight, based on the weight of the acrylic polymer, of methyl methacrylate, 25–45% by weight, based on the weight of the acrylic polymer, of butyl methacrylate of lauryl methacrylate and 5–20% by weight, based on the weight of the acrylic polymer, of glycidyl methacrylate, said polymer being reacted with ammonia to provide hydroxy amino ester groups pendent from the carbon-carbon polymer backbone of the formula

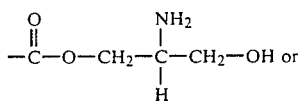

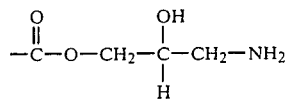

6. The coating composition of claim 1 containing about 0.1-4% by weight, based on the weight of the binder, of a catalyst selected from the group consisting of resorcinol, resorcinol monobenzoate, boron trifluoride amine complex, phenol, para methoxy phenol and hydroquinone.

7. The coating composition of claim 1 containing 0.1-5% by weight, based on the weight of the binder, of ultraviolet light stabilizer.

8. The coating composition of claim 1 containing pigments in a pigment-to-binder weight ratio of about 10:100 to 150:100, wherein the binder consists essentially of:

A. An acrylic polymer consisting essentially of about 35-55% by weight, based on the weight of the acrylic polymer, of methyl methacrylate, 35-50% by weight, based on the weight of the acrylic polymer, of lauryl methacrylate and 10-15% by weight, based on the weight of the acrylic polymer of methacrylic acid, said polymer reacted with propylene imine to provide amino ester group pendent from the carbon-carbon polymer backbone of the formula

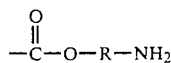

where R is an alkylene group of 3 carbon atoms;

B. a glycidyl acrylic crosslinking polymer consisting essentially of about 60-85% by weight, based on the weight of the glycidyl acrylic crosslinking polymer, of a glycidyl methacrylate and 15-40% by weight, based on the weight of the glycidyl acrylic crosslinking polymer, of lauryl methacrylate;

C. about 0.1-4% by weight, based on the weight of the binder, of a catalyst selected from the group consisting of resorcinol, resorcinol monobenzoate, boron trifluoride amine complex, phenol, para methoxy phenol, and hydroquinone; and D. about 0.1-5% by weight, based on the weight of the binder, of ultraviolet light stabilizer.

9. The coating composition of claim 1 containing pigments in a pigment-to-binder weight ratio of about 10:100 to 150:100, wherein the binder consists essentially of A. an acrylic polymer consisting essentially of 40-50% by weight, based on the weight of the acrylic polymer, of methyl methacrylate, 25-45% by weight, based on the weight of the acrylic polymer, of lauryl methacrylate and 5-10% by weight, based on the weight of the acrylic polymer, of glycidyl methacrylate, said polymer reacted with ammonia to provide hydroxy amino ester groups pendent from the carbon-carbon polymer backbone of the formula

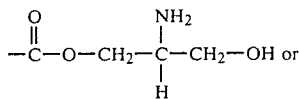

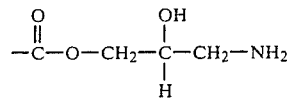

B. glycidyl acrylic crosslinking polymer consisting essentially of about 60-85% by weight, based on the weight of the glycidyl acrylic crosslinking polymer, of glycidyl methacrylate and 15-40% by weight, based on the weight of the glycidyl acrylic crosslinking polymer, of lauryl methacrylate;

C. about 0.1-4% by weight, based on the weight of the binder, of a catalyst selected from the group consisting of resorcinol, resorcinol monobenzoate, boron trifluoride amine complex, phenol, paramethoxy phenol and hydroquinone; and D. about 0.1-5% by weight, based on the weight of the binder, of ultraviolet light stabilizing agent.

10. A two-component composition comprising components (A) and (B), wherein said components are blended together to form a coating composition comprising 20-80% by weight binder and 80-20% by weight of solvent for the binder and wherein component (A) consists of 60-80% by weight of the binder and consists essentially of an acrylic polymer of polymerized monomers of methyl methacrylate, an alkyl methacrylate, alkyl acrylate or mixtures thereof, each having 2-12 carbon atoms in the alkyl group and said polymer having pendent hydroxy amino ester groups or amino ester groups; and component (B) consists of 20-40% by weight of the binder and consists essentially of a glycidyl acrylic polymer of polymerized monomers of at least 60% by weight of glycidyl methacrylate or glycidyl acrylate and polymerized monomers of alkyl methacrylate, alkyl acrylate or mixtures thereof, each having 2-12 carbon atoms in the alkyl group.

11. A substrate coated with a dried layer of the composition of claim 1.

12. A coating composition comprising 20-80% by weight of a binder and 80-20% by weight of a solvent for the binder, wherein the binder consists essentially of about:

A. 60-80% by weight, based on the weight of the binder, of an acrylic polymer consisting essentially of polymerized monomers of 10-50% by weight styrene and monomers selected from the group consisting of alkyl methacrylate and alkyl acrylate each having 1-12 carbon atoms in the alkyl group and said polymer having pending from the carbon-carbon atoms of the polymer backbone aminoester groups of the formula

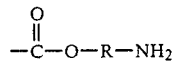

where R is an alkylene group having 2-3 carbon atoms or hydroxyamino ester groups of the formula

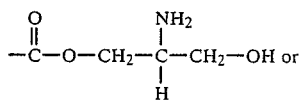

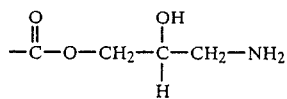

B. 20-40% by weight, based on the weight of the binder, of a glycidyl acrylic crosslinking polymer of polymerized monomers having at least 60% by weight of a glycidyl constituent selected from the group consisting of glycidyl methacrylate and glycidyl acrylate and polymerized monomers selected from the group consisting of alkyl methacrylate and alkyl acrylate each having 2-12 carbon atoms in the alkyl group;

said polymer having a weight average molecular weight of about 6,000-40,000 determined by gel permeation chromatography using polymethyl methacrylate as a standard.

13. The coating composition of claim 12 in which the acrylic polymer consists essentially of about 20-50% by weight, based on the acrylic polymer, of styrene, 30-70% by weight, based on the weight of the acrylic polymer, of butyl methacrylate and 10-15% by weight, based on the weight of the acrylic polymer, of methacrylic acid; said polymer reacted with an alkylene imine to provide amino ester groups pendent from the carbon-carbon polymer backbone of the formula

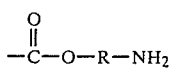

where R is an alkylene group having 2-3 carbon atoms.

14. The coating composition of claim 12 in which the glycidyl acrylic crosslinking polymer consists essentially of about 60-85% by weight, based on the weight of the glycidyl acrylic crosslinking polymer, of glycidyl methacrylate and 15-40% by weight, based on the weight of the glycidyl acrylic crosslinking polymer, of lauryl methacrylate or butyl methacrylate.

15. The coating composition of claim 14 in which the acrylic polymer consists essentially of 20-50% by weight, based on the weight of the acrylic polymer, of styrene, 30-70% by weight, based on the weight of the acrylic polymer, of butyl methacrylate and 5-20% by weight, based on the weight of the acrylic polymer, of glycidyl methacrylate, said polymer being reacted with ammonia to provide hydroxy amino ester groups pendent from the carbon-carbon polymer backbone of the formula

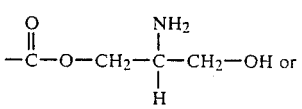

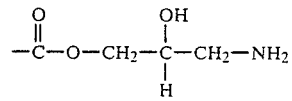

16. The coating composition of claim 12 containing about 0.14-4% by weight, based on the weight of the binder, of a catalyst selected from the group consisting of resorcinol, resorcinol monobenzoate, boron trifluoride amine complex, phenol, para methoxy phenol and hydroquinone.

17. The coating composition of claim 12 containing 0.1-5% by weight, based on the weight of the binder, of ultraviolet light stabilizer.

* * * * *